March 8, 1960 V. RUIZ 2,927,331
INSECT NETTING FOR CRIBS AND THE LIKE
Filed Sept. 19, 1958 2 Sheets-Sheet 2
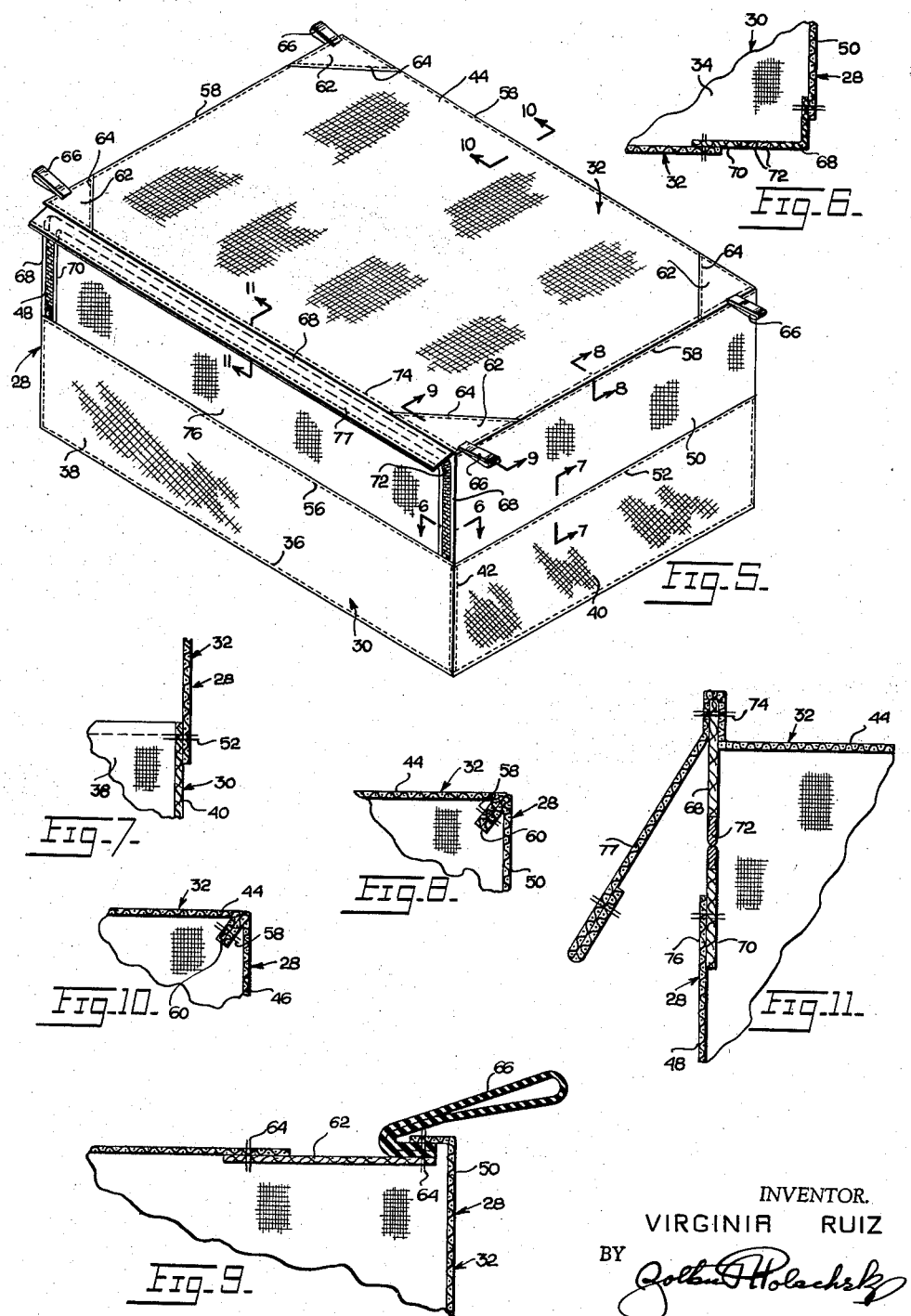
INVENTOR.
VIRGINIA RUIZ
BY
ATTORNEY

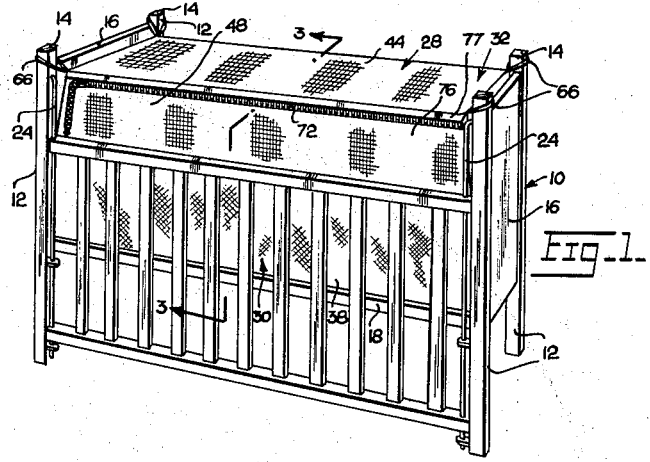
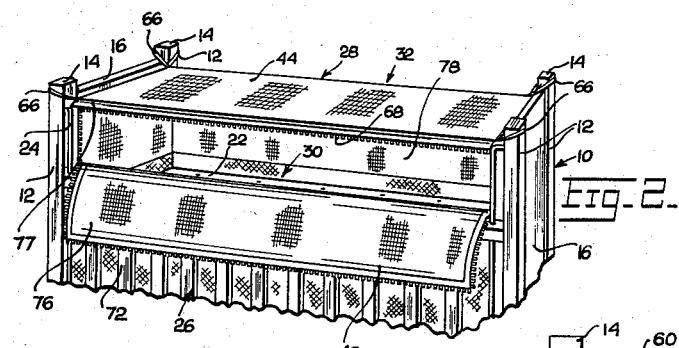
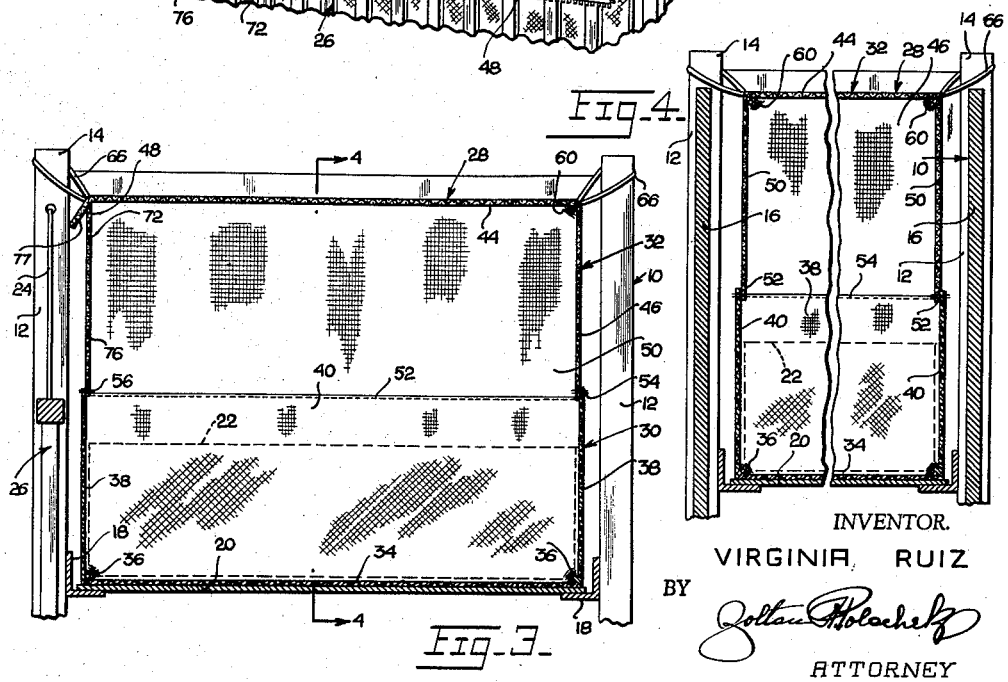
INVENTOR.
VIRGINIA RUIZ

2,927,331
INSECT NETTING FOR CRIBS AND THE LIKE

Virginia Ruiz, Rego Park, N.Y.

Application September 19, 1958, Serial No. 761,973

1 Claim. (Cl. 5—362)

This invention relates generally to devices intended to protect one against insects. More particularly, the invention has reference to an insect netting adapted particularly for application to a child's crib, and designed to provide full protection for the child against mosquitoes, flies, gnats, and crawling insects.

The main object of the present invention is to provide an improved insect netting, which can be swiftly and easily placed inside a crib, in such a way as to extend completely around the infant, so that under no circumstances can an insect enter the netting.

Heretofore, insect nettings have been designed, including those applied over cribs, beds, etc. However, these have not been especially designed to provide maximum protection. An important object of the present invention, accordingly, is to afford said maximum protection.

Another object is to provide an insect netting as stated which will be usable in a conventional crib, and with a conventional crib mattress, without requiring modification or redesign of these components.

A further object is to so form the insect netting that it will not interfere with placement of a child within the crib, or removal of the child from the crib.

Another object is to form the netting inexpensively while still accomplishing the unusual and decidedly beneficial purposes hereinabove set forth.

Still another object is to provide full visibility of the child, without interference from the netting.

A further object is to permit the infant full freedom of movement as the infant lies upon the mattress.

A further object is to reinforce the netting, so that it will have a long life and will be adapted to be laundered a substantial number of times without deterioration.

A further object is to cause the netting to assume a box-like, extended shape through a cooperating action by the crib mattress and the corner posts of the crib.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a crib equipped with insect netting according to the present invention.

Fig. 2 is a view similar to Fig. 1 in which the lower portion of the crib is not shown, the netting being opened.

Fig. 3 is an enlarged transverse section on line 3—3 of Fig. 1, a mattress being shown in dotted lines.

Fig. 4 is a longitudinal section substantially on line 4—4 of Fig. 3, portions being broken away.

Fig. 5 is an enlarged perspective view of the netting per se.

Figs. 6, 7, 8, 9, 10 and 11 are still further enlarged detail sectional views on lines 6—6, 7—7, 8—8, 9—9, 10—10, and 11—11, respectively, of Fig. 5.

Referring to the drawings in detail, generally designated 10 is a rectangular-shaped infant's crib, having the usual corner posts 12, the upper ends 14 of which project a short distance above the usual end walls 16 fixedly connected between the corner posts at each end of the crib. Secured to the corner posts 14 and extending along the respective sides of the crib are longitudinal support rails 18 supporting a spring 20. This is illustrated only diagrammatically in Figs. 3 and 4 and, of course, could be any of various types of well-known crib springs. Ordinarily, the mattress 22 is supported directly upon the springs 20. Connected to the corner posts 14, at least at one side of the crib, are vertically extending guide rods 24. Vertically slidable upon said guide rods is the upwardly and downwardly movable crib side 26. All this is conventional construction and does not per se constitute part of the present invention.

The insect netting constituting the present invention has been generally designated at 28, and as shown in Fig. 5, is of a rectangular, box-like shape when in use. The netting when in use appears as in Figs. 3 and 4, with the several upper corners of the netting being supported from the corresponding upper ends 14 of the corner posts 12. The netting receives the entire mattress 22, as shown in Figs. 3 and 4. Thus it will become immediately apparent that the infant is completely enclosed within the device shown in Fig. 5, so as to have full protection against insects, whether of the flying or crawling variety.

The netting has a lower portion 30 and an upper portion 32. The lower portion 30 is of rectangular shape, and is formed of a fabric such as a strong cotton broadcloth or the like. The upper portion 32, however, is formed of an open-mesh fabric net material. Thus, air circulates freely through the article when the same is in use, and further, the infant can see and be seen through the netting.

The lower portion 30 receives the mattress 22, as shown in Fig. 3, and the side and end walls of the lower portion 30 can project a short distance above the top surface of the mattress, in a typical embodiment of the invention.

The particular manner in which the article can be made can vary, of course. In a typical arrangement, the lower portion 30 would have a bottom panel 34, stitched at its periphery as at 36 (see Fig. 5) to side panels 38 and end panels 40. These are stitched to each other at 42 at the several corners of the insect netting.

Considering now the construction of the upper portion 32, this has a top panel 44, a first side panel 46 which may also be appropriately termed a back panel, a second side panel 48 which may be termed a front panel, and end panels 50. At their lower edges, the end panels 50 are stitched at 52 to the upper edges of the end panels 40 of the lower portion 30. At their lower edges, the panels 46, 48 are stitched at 54, 56, respectively, to the side panels 38 of lower portion 30. Extending peripherally of the top panel 44, along the ends and the back side of said top panel, is a line of stitching 58 (see Figs. 5, 8 and 10). This marks the dividing line between the top panel 44 and the end panels 50 and rear side panel 46, said end and side panels being integral with the top panel 44. Stitching 58 bunches the material of the netting as shown in Figs. 8 and 10, forming a peripheral reinforcement 60 projecting interiorly of the insect netting.

Triangular corner pieces 62, of stout fabric, are stitched at 64 in the corners of the top panel 44, providing corner reinforcements, and stitched to the reinforcement (Fig. 9) are fabric loops 66, engageable over the upper ends 14 of the several corner posts.

The front side panel 48 includes cooperating slide fastener tapes 68, 70 of fabric material, having interengageable slide fastener elements 72. The outer tape 68 is stitched as at 74 over its full length to the adjacent edges of the end panels 50, and top panel 44. Thus, the slide fastener strips provides a reinforcement extending at the ends and top edge of the front panel 48.

The slide fastener tape 70 is stitched over its full length to the ends and top edge of a flap 76, also of net material, which cooperates with the tapes 68, 70 in providing the front panel.

Thus, when the slide fastener is open, the flap 76 is freed at its ends and along its top edges, so that it can be swung outwardly to the Fig. 2 position, providing access to the inside of the insect netting, for either putting the infant into the crib or taking the infant therefrom.

Referring to Figs. 5 and 11, the stitching 74 extends along the top edge of the fastener strip 68, and the material of the top panel 44 is continued laterally outwardly to provide a narrower cover flap or lip 77, which normally overlies the horizontal top portion of the slide fastener.

In the description which has been provided, it will be seen that the invention comprises a generally rectangular, collapsible article, the upper corners of which are provided with means engageable with the upper corners of the crib, said article being adapted to be opened along one side and being adapted to receive the mattress, so that the mattress holds the article down at its bottom. Thus, the corner posts of the crib and the mattress cooperate in holding the entire article in an extended, rectangular, box-like shape shown in several figures of the drawing. The mattress constitutes a weight as well as a means for spreading the entire article out into its rectangular shape at its bottom. Thereafter, the corner posts serve to tension the upper portion of the article by connecting the same to the corners of the crib. In this way, a very roomy, open-mesh enclosure for the infant is provided, that provides the infant full freedom of movement about the mattress, and that affords full visibility of the infant. At the same time, and quite importantly, the construction is such that the infant and his mattress are completely enclosed. No insect, either of the flying or crawling variety, can obtain access to the infant.

The article has a further desirable characteristic in that it can be swiftly removed for the purpose of being laundered. The opening 78 (Fig. 2) resulting from swinging of the flap 76 to open position, is extended the full length of the crib, so that the entire device can be slipped onto the mattress with ease and can be removed with equal ease. In other words, assuming that one were to desire to place the article in operative relation to the mattress and crib frame, one could merely turn the mattress so that it stands upon one longitudinal edge thereof, with the other longitudinal edge projecting upwardly. Then, with the device open, the device can be placed on the mattress by being fitted downwardly about the mattress with the mattress moving through opening 78. Said opening, in other words, is of a length and height readily adapted to permit the mattress to move therethrough.

It is to be understood that the netting may be made of any suitable material including plastics and made of various sizes to fit cribs or the like.

While I have illustrated and described the preferred embodiment of my invention, it is to be also understood that I do not limit myself to the precise construction herein disclosed and that various changes and modifications may be made within the scope of the invention as defined in the appended claim.

Having thus described my invention, what I claim as new, and desire to secure by United States Letters Patent is:

An insect netting for cribs and the like, comprising a rectangular enclosure body formed at least partially of an open-mesh fabric and proportioned to receive a mattress with a portion of said enclosure body projecting above the mattress, means on said enclosure body for connecting said portion thereof to a crib at a location above the mattress, said portion of the enclosure body composed substantially wholly of said open-mesh fabric, said enclosure body further including a lower portion comprising the part of the enclosure body that receives the mattress, said lower portion composed of a fabric having a closer mesh than the fabric of said upper portion, said upper portion including a top panel, end panels, and side panels, said end and side panels extending downwardly from the ends and sides, respectively, of the top panel, one of said side panels having an opening and including a flap normally closing said opening, said flap having a slide fastener extending along top and end edges of the flap and said one panel for holding the flap in a closed position and whereby said opening is wholly cleared by disengaging the slide fastener and dropping the entire body of said flap to overlay a side panel of said bottom portion, said bottom portion including a bottom panel proportioned to be covered by the mattress, and further including end and side panels extending upwardly from the ends and sides, respectively, of the bottom panel, corresponding panels of the upper and bottom portions being stitched together intermediate the top and bottom panels, said means comprising loops secured at corners of said top panel for engaging on posts of said crib.

References Cited in the file of this patent

UNITED STATES PATENTS

| | | |
|---|---|---|
| 1,892,378 | Bernstein | Dec. 27, 1932 |
| 1,995,205 | Gail | Mar. 19, 1935 |
| 2,287,907 | Schettler | June 30, 1942 |
| 2,464,866 | Holtz | Mar. 22, 1949 |
| 2,586,247 | Mover | Feb. 19, 1952 |
| 2,624,333 | Dixon et al. | Jan. 6, 1953 |
| 2,667,648 | Donovan | Feb. 2, 1954 |

FOREIGN PATENTS

| | | |
|---|---|---|
| 713,977 | France | Aug. 24, 1931 |